Jan. 23, 1940.  J. H. NELSON  2,188,251
PRELOAD ADJUSTMENT FOR BALL BEARINGS
Filed Oct. 28, 1938
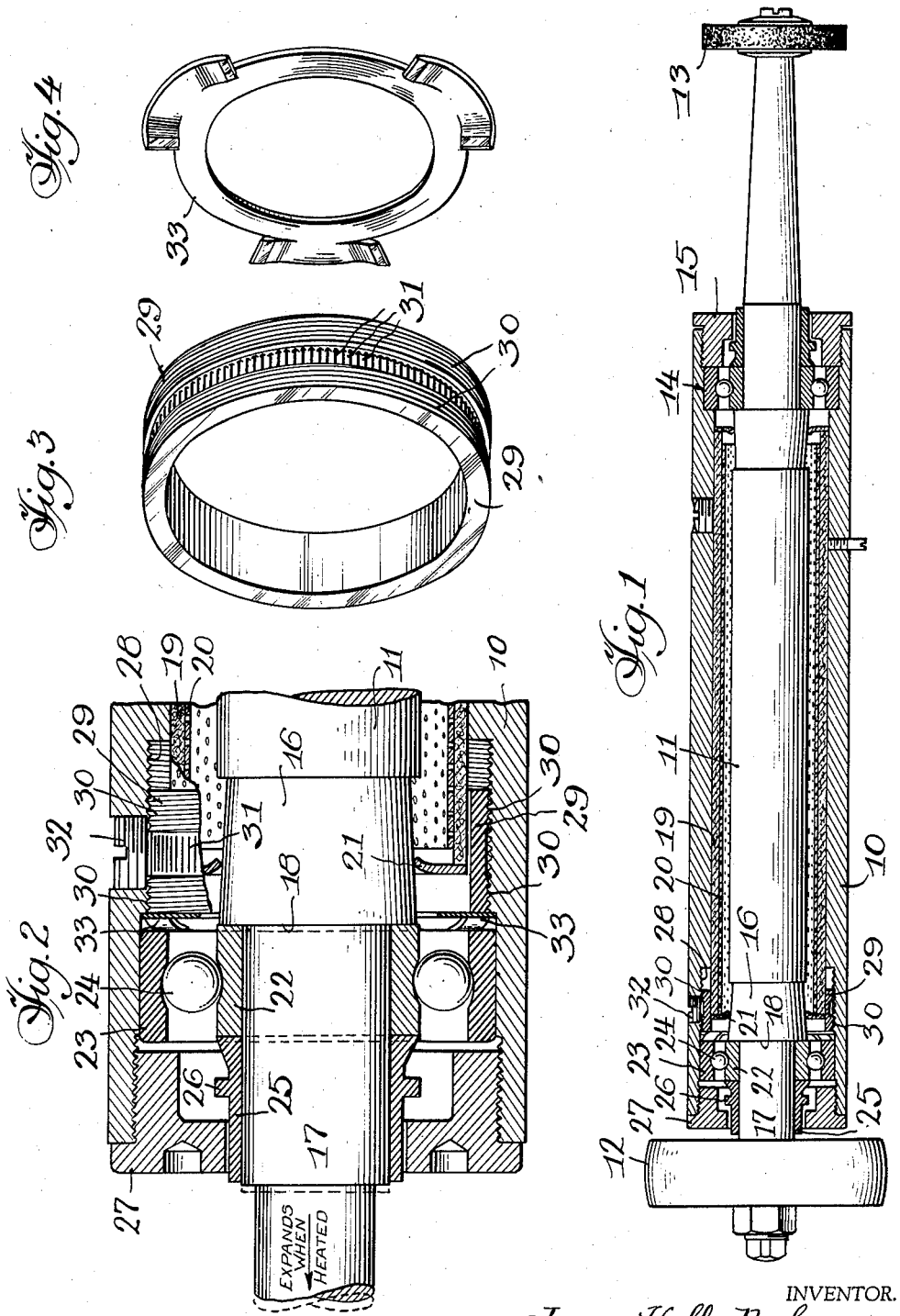
INVENTOR.
James Holly Nelson,
BY Chritton, Wiles, Davies, Hirschl & Dawson  ATTORNEYS.

Patented Jan. 23, 1940

2,188,251

UNITED STATES PATENT OFFICE 2,188,251

PRELOAD ADJUSTMENT FOR BALL BEARINGS

James Holly Nelson, Racine, Wis., assignor to The Dumore Company, Racine, Wis., a corporation of Wisconsin Application October 28, 1938, Serial No. 237,562

9 Claims. (Cl. 308—189)

My invention relates to improvements in preload adjustments for ball bearings. It is particularly useful in connection with the rotating shafts of high speed grinders, although it is not limited to such use.

Where a shaft rotates at high speed inside of a supporting housing, with ball bearing raceways at each end, considerable heat is developed at the ball bearing raceways. The outer ring of the raceway which is in contact with the outer cylinder or so-called "quill", dissipates heat more readily than the inner ring of the raceway and its associated parts, with the result that the rotating shaft is heated more than the casing or quill which surrounds it, and expands longitudinally. This has the effect of displacing the inner ring to the right or left with respect to the outer ring, so that the pressure of the rings on the balls varies under different conditions.

High speed grinder shafts may run anywhere from 10,000 to 42,000 revolutions a minute. It has been the practice when assembling grinders heretofore to displace one of the raceways slightly to the right or to the left by means of spring pressure in order to create a slight pressure on the balls and thus insure initially a tight bearing, i. e. with no looseness. For heavy grinding wheels the pressure on the ball bearings should be greater than for very small ones, as for example those wheels less than an inch in diameter. The arrangement has been such that when the shaft expanded, it was held at one end, and, therefore, was caused to project a little farther from the quill at the other end, the accompanying relative movement of the ball bearing raceways being such as to increase the pressure on the balls, making a tighter bearing, which was just the opposite of what was desired. At higher speeds of the shaft, the heat developed is greater and hence the pressure became greater at speeds where pressure on the balls should be less, i. e. in the case of small grinding discs, rotating at some of the very high speeds that can be used only with the smaller grinding discs.

The object of the present invention is to overcome this difficulty by providing a bearing in which the initial pressure or preload on the ball bearing raceway at one end is such that as the shaft expands, the pressure on the balls becomes less instead of greater.

A related object is to provide a properly designed spring and preloading it so that with the maximum range of movement, the spring will still exert the proper pressure so that the bearing will be sufficiently snug at the higher speeds as well as at lower speeds.

In the drawing I have illustrated a commercial embodiment of the invention, in which:

Fig. 1 is a section of a housing containing a shaft supporting a grinding wheel;

Fig. 2 is an enlarged sectional view of the ball bearing assembly at the left hand end of the housing;

Fig. 3 is a perspective view of the adjusting ring; and

Fig. 4 is a perspective view of a spring washer.

In Fig. 1 the housing 10 which carries the rotatable shaft 11, is cylindrical and is clamped in a bracket associated with an electric motor. A typical electric grinder with which the quill assembly may be employed is shown in Beach Patent 1,859,068, issued May 17, 1932 to The Dumore Company.

A driving pulley 12 is mounted on what may be called the left hand end of the shaft, as viewed in Fig. 1, and the grinding wheel 13 is mounted at the right hand end thereof. This grinding wheel is intended merely as illustrative and may have substituted therefor any one of a number of grinding wheels of different sizes. The right hand end of the shaft is supported in the usual ball bearing assembly 14 which is held in place by a cap or end closure 15, screwed into the open end of the housing 10.

The left hand end of the shaft, as viewed in Fig. 1, is provided with a ball bearing having the preload adjustment of this invention. Said shaft has an inclined or conical surface 16 and an extension 17 of reduced diameter, resulting in a shoulder 18 between the two.

An arrangement for oiling the shaft is provided consisting, briefly stated, of a tubular member 19 of absorbent material such as felt, drawn over a supporting shell 20 and having an inwardly extending absorbent member 21 which contacts with the tapering portion 16 of the shaft to supply oil thereto, from which portion the oil makes its way to the ball bearing.

The inner ball bearing ring or raceway 22 has a pressed fit on the shaft and bears against the shoulder 18. There is the usual outer raceway 23 with a row of balls 24 between said raceways. The grooves in the raceways which face each other have a radius somewhat larger than the radius of the balls, thereby permitting a slight lateral adjustment of the raceways with respect to each other. The inner raceway 22 is held in place by an oil-throwing ring 25 which has also a pressed fit on the reduced portion 17 of the shaft.

Said ring has a flange 26 to prevent oil from working out of the housing. An end closure or cap 27 is screwed into the open end of the housing 10 to close said opening but makes no contact either with the ring 25 just referred to or with the outer raceway 23.

Said outer raceway has a sliding fit with the surrounding wall of the housing 10. Said housing is bored out to provide a screw threaded recess 28 which receives a ring 29 having screw threads 30—30 thereon with an intervening surface, of somewhat reduced diameter, which is knurled or provided with what may be called ratchet teeth 31. The housing has a radial opening which is normally occupied by the lock screw 32. When this screw is removed, any suitable instrument may be introduced through the opening to engage the ratchet teeth and rotate the ring step by step in one direction or the other to adjust it axially with respect to the length of the housing 10.

Confined between said ring 29 and the outer raceway 23 is a spring washer 33. As shown in Fig. 4, said spring has radially arranged arms each having circumferential extensions bent out of the plane of said spring, each extension having bevelled ends providing flat surfaces to engage said outer ring 23. This spring washer tends to move the outer raceway to the left, as viewed in the Fig. 2 position. The inner raceway 22 is fast on the shaft and since the latter is held by the ball bearing assembly at the right hand end thereof against longitudinal movement, said inner raceway 22 is, in effect, held in fixed position longitudinally. Pressure on the outer raceway 23, however, moves the same slightly with respect to said inner raceway and thereby causes a pressure on the balls, giving them what may be called a preload. In Fig. 2 the outer raceway is shown as offset or out of alignment with the inner raceway, this displacement being exaggerated to make the showing more clear.

When the shaft rotates, and particularly when it rotates at high speeds, it becomes heated more than the housing 10, and, therefore, expands in such a direction that the end which is shown as carrying the pulley, projects further from the housing than when the parts are cold. This movement of the left hand end of the shaft carries with it the inner raceway 22 and hence tends to reduce the offset or relative displacement of the two raceways. This tends to permit the outer raceway to move to the left slightly, i. e. to increase the space between said raceway and said ring 29, which in turn lessens the effective pressure of the spring washer on the outer raceway. Thus the preloading or pressure on the ball is reduced and such reduction is greater as the speed of rotation becomes greater. In other words, there is an automatic offset by means of which the initial adjustment of the ring 29 may be such as to give substantially the desired pressure on the ball bearings at very high speeds.

In heavy grinding wheels the pressure on the ball bearings should be greater than where very small grinding wheels are used, as for example those wheels less than an inch in diameter. The larger wheels, for example, are not rotated at speeds as high as the smaller wheels, and, therefore, do not heat up as much and the preloading is not reduced as much at the higher speeds, which is what is desired. In general, the bearings will not stand as much loading at high speeds as at lower speeds and when very small wheels are used, for example, for instance one-eighth of an inch in diameter, the grinding speeds may be very high with a corresponding reduction in the pressure as compared with the initial preloading pressure.

With the arrangement described, the preloading adjustment is coordinated with the expected expansion of the spindle, which in turn is dependent on the speeds to be used. After the ring 29 has once been adjusted, however, to apply the proper pressure to the spring washer, the lock screw is screwed into place and sealed so that it cannot be disturbed by the user. It will thus be noted that the preload adjustment is an internal adjustment which is not easily tampered with and which is sealed within the quill. Thus it will be seen that the pressure applied to the bearings will vary as to the range of speeds at which the quill will be used and also is determined according to the size of the bearings and quill. Also, this assembly eliminates the necessity of having to machine to such close limits in order to get the predetermined preload.

I claim:

1. In a ball bearing assembly, a shaft, a housing therefor, an inner raceway on said shaft and rotatable therewith, an outer raceway mounted in said housing and slidable axially thereof, a series of bearing balls between said raceways and traveling in a groove in each of said raceways, a spring washer confined between said outer raceway and an abutment in said housing and tending to move said raceway axially in the same direction as the movement of the shaft under expansion when heated, thereby preloading the ball bearing when said shaft is stationary, the axial movement of said inner raceway with the expanding shaft serving to reduce the preloading pressure.

2. A mounting for a rotatable shaft, comprising a housing having an opening intermediate the ends thereof, a ball bearing assembly near one end of said housing comprising an outer and an inner raceway with balls between, a shaft in said housing on one part of which said inner raceway is mounted to support said shaft, another ball bearing assembly supporting another part of said shaft and confining the same against longitudinal movement, an abutment adjustable with respect to its distance from said other ball bearing assembly and positioned within said housing adjacent the opening therein, to render said abutment available for adjustment from without, a resilient member arranged against said abutment and normally pressing the outer raceway of said first ball bearing assembly away from said second ball bearing assembly, to preload said first mentioned assembly the desired amount, whereby expansion of said shaft due to heat will move said inner raceway away from said second ball bearing assembly and reduce the preloading pressure.

3. A ball bearing assembly comprising an outer and an inner raceway with balls between, a shaft on which said inner raceway is mounted near one end of said shaft, another ball bearing assembly supporting the other end of said shaft and confining the same against longitudinal movement, a housing for said assemblies and said shaft, an abutment in said housing in the form of a ring having screw threaded engagement therewith whereby said abutment is adjustable with respect to its distance from said other ball bearing assembly, a resilient member arranged against said abutment and normally pressing the outer raceway of said first ball bearing assembly away from said second ball bearing assembly, to preload said first mentioned assembly the desired amount, whereby expansion of said shaft due to heat will move said inner raceway away from said second ball bearing assembly and reduce the preloading pressure.

4. An assembly for a high speed, rotatable shaft comprising a housing having a ball bearing unit in each end thereof, a shaft supported by said units, one of said units confining said shaft against longitudinal movement while permitting rotation thereof, the other of said units comprising an inner ring having an outer groove of greater radius than the balls running therein, an outer ring having an inner groove of substantially the same radius as that of said inner ring whereby said rings are displaceable longitudinally, said outer ring having sliding engagement with the surrounding wall of said housing, a threaded annular recess extending inwardly from said outer unit, a ring-shaped abutment having threaded areas near each end and a roughened intervening area in register with an opening in the wall of said housing, whereby a tool may be inserted in said opening to rotate said ring and adjust it longitudinally, and a spring washer between said ring-shaped abutment and the outer ring of said ball bearing unit to bias the said ring toward the adjacent end of said housing.

5. A mounting for a high speed rotatable shaft comprising a housing having a ball bearing assembly in one end thereof the inner raceway having a pressed fit on said shaft, a shoulder on said shaft engaging one side of said inner raceway, an oil-throwing ring on the other side thereof also having a pressed fit on said shaft, the outer raceway having a sliding fit in said housing, a cap closing the open end of said housing but out of contact with said raceways and said oil-throwing ring, a ring on the opposite side of said outer raceway having screw threaded engagement with the wall of said housing, said ring having ratchet teeth to permit it to be rotated for longitudinal adjustment, and a disc spring between said ring and said outer raceway.

6. A ball bearing assembly comprising an inner and outer raceway with a series of balls between the two, a shaft on which said inner raceway is mounted, means normally pressing said outer raceway in a direction longitudinally with respect to said shaft and thereby tending to maintain said inner and outer raceways out of register, whereby movement of said shaft in a direction the same as the displacement of said outer raceway will tend to restore the register of said inner raceway with respect to said outer raceway, and means for adjusting the pressure on said first mentioned means to preload the ball bearing assembly in accordance with the anticipated expansion of the shaft due to variations in the heating of the same while it rotates at different speeds.

7. In a ball bearing housing having a circular recess in one end with a screw threaded wall, a ring within said housing having screw threaded engagement with said wall, a ball bearing raceway in said recess spaced outwardly from said ring and a spring washer between said ring and raceway and engaging said ring on one side and the outer raceway only, on the other side.

8. A device as in claim 7 in which said spring washer comprises a ring of stiff resilient metal with radially arranged arms extending therefrom and bent out of the plane of said ring.

9. A device as in claim 7 in which said spring washer comprises a closed ring of stiff resilient material with evenly spaced radially arranged arms of uniform thickness around its circumference, said arms each having a circumferential extension bent out of the plane of said ring and having a beveled end providing a flat surface to be engaged by the adjacent walls between which said spring washer is confined.

JAMES HOLLY NELSON.